US012772199B2

(12) United States Patent
Xie et al.

(10) Patent No.: US 12,772,199 B2
(45) Date of Patent: Oct. 20, 2026

(54) SYSTEMS AND METHODS FOR REFERENCE SIGNALING DESIGN AND CONFIGURATION

(71) Applicant: ZTE Corporation, Shenzhen (CN)

(72) Inventors: Saijin Xie, Shenzhen (CN); Focai Peng, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 327 days.

(21) Appl. No.: 18/737,540

(22) Filed: Jun. 7, 2024

(65) Prior Publication Data

US 2024/0389062 A1 Nov. 21, 2024

Related U.S. Application Data

(63) Continuation of application No. PCT/CN2022/086007, filed on Apr. 11, 2022.

(51) Int. Cl.
*H04L 1/00* (2006.01)
*H04L 5/00* (2006.01)
(Continued)

(52) U.S. Cl.
CPC ........... *H04W 64/00* (2013.01); *H04L 5/0051* (2013.01); *H04W 8/22* (2013.01)

(58) Field of Classification Search
CPC ......... H04W 64/00; H04W 8/22; H04W 4/02; H04W 4/029; H04W 24/08; H04L 5/0051;
(Continued)

(56) References Cited

U.S. PATENT DOCUMENTS 11,812,404 B2 * 11/2023 Bao ..................... H04W 64/006
2021/0293917 A1 9/2021 Yuan et al.
(Continued)

FOREIGN PATENT DOCUMENTS

CN 109196925 A 1/2019
CN 113691929 A 11/2021
(Continued)

OTHER PUBLICATIONS

Catt, "Discussion of NR positioning enhancements", 3GPP TSG RAN WG1 Meeting #101, R1-2003642, Jun. 5, 2020, e-meeting (18 pages).

(Continued)

*Primary Examiner* — Tanmay K Shah
(74) *Attorney, Agent, or Firm* — Foley & Lardner LLP

(57) ABSTRACT

Presented are systems and methods for signaling design and configuration. A first wireless device may receive a first positioning-related signal with a first carrier frequency and a second positioning-related signal with a second carrier frequency. The first wireless device may determine a carrier phase measurement with respect to the first positioning-related signal and the second positioning-related signal, under a constraint of having a difference between the first carrier frequency and the second carrier frequency to be conformed against a defined value. The first wireless device may send the carrier phase measurement to a second wireless device.

20 Claims, 9 Drawing Sheets

(51) Int. Cl.
*H04W 8/22* (2009.01)
*H04W 64/00* (2009.01)

(58) Field of Classification Search
CPC ... H04L 2027/002; H04L 5/001; H04L 5/005; H04L 27/0014; H04L 27/2613; H04L 27/2657; H04L 5/0048; G01S 5/0009; G01S 5/0036; G01S 1/0428; G01S 5/02; G01S 5/0205; G01S 5/10; H04B 17/252; H04B 17/254
USPC ........................................................ 455/456.1
See application file for complete search history.

(56) References Cited

U.S. PATENT DOCUMENTS

| | | | | |
|---|---|---|---|---|
| 2023/0180172 | A1 | 6/2023 | Zhang et al. | |
| 2023/0422072 | A1* | 12/2023 | Yerramalli | H04L 5/001 |

FOREIGN PATENT DOCUMENTS

| | | | | | |
|---|---|---|---|---|---|
| CN | 113973261 | A | | 1/2022 | |
| JP | 2022109922 | A | * | 7/2022 | H04B 7/0452 |
| WO | WO-2022079694 | A2 | * | 4/2022 | G01S 5/0205 |

OTHER PUBLICATIONS

Extended European Search Report for EP Appl. No. 22936751.1, dated Feb. 14, 2025 (9 pages).
Examination Report No. 3 for AU Appl. No. 2022452531, dated Aug. 22, 2025 (4 pages).
Catt, "Discussion of evaluation of NR positioning performance", 3GPP TSG RAN WG1 Meeting #103, R1-2007859, Nov. 13, 2020, Electronic Meeting (26 pages).
International Search Report and Written Opinion for PCT Appl. No. PCT/CN2022/086007 mailed Dec. 16, 2022, (8 pages).

* cited by examiner

SYSTEMS AND METHODS FOR REFERENCE SIGNALING DESIGN AND CONFIGURATION

CROSS-REFERENCE TO RELATED APPLICATION

This application claims the benefit of priority under 35 U.S.C. § 120 as a continuation of International Patent Application No. PCT/CN2022/086007, filed on Apr. 11, 2022, the disclosure of which is incorporated herein by reference in its entirety.

TECHNICAL FIELD

The disclosure relates generally to wireless communications, including but not limited to systems and methods for reference signaling design and configuration.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A first wireless device (e.g., UE or BS) may receive a first positioning-related signal with a first carrier frequency and a second positioning-related signal with a second carrier frequency. The first wireless device may determine a carrier phase measurement (e.g., phase difference between at least two signals) with respect to the first positioning-related signal and the second positioning-related signal, under a constraint of having a difference between the first carrier frequency and the second carrier frequency to be conformed against a defined value. The first wireless device may send the carrier phase measurement to a second wireless device (e.g., BS, LMF, or UE). The carrier phase measurement may comprise beam indices (or RxTEG ID) corresponding to the first positioning-related signal and the second positioning-related signal. At least one of the first positioning-related signal or the second positioning-related signal each may comprise: a sounding reference signal (SRS), or a positioning reference signal (PRS).

In some embodiments, the difference between the first carrier frequency and the second carrier frequency may be configured to be at least one of: equal to a defined value, greater than the defined value, or smaller (e.g., slightly smaller) than the defined value. The defined value may comprise a bandwidth of a positioning reference signal (PRS) of the first positioning-related signal or the second positioning-related signal (e.g., the larger bandwidth of two positioning frequency layers). The carrier phase measurement may comprise absolute values or difference values, in different component carriers or positioning frequency layers, or in different parts within a same component carrier or positioning frequency layer. Positioning reference signal (PRS) resources configured in different component carriers or positioning frequency layers may have same subcarrier spacing (SCS) indices.

In some embodiments, the first wireless device may comprise a user equipment (UE) or a base station (BS). The second wireless device may comprise a base station (BS), a location management function (LMF), or a user equipment (UE). In some embodiments, the first wireless device may indicate an associated relationship of positioning reference signal (PRS) resources, in a group of PRS resources that are configured. The wireless device may receive a request to use the associated relationship to transmit the PRS resources in different component carriers or positioning frequency layers, from the second wireless device. The wireless device may receive a request to use the associated relationship to transmit the PRS resources in different parts within a same component carrier or positioning frequency layer. The associated relationship may comprises a timing relationship (e.g., an identifier of a timing error groups (TxTEG ID) per transmission/reception point (TRP)) or a spatial relationship (e.g., Quasi co location (QCL), transmission configuration indication (TCI)).

In some embodiments, the first wireless device may indicate an identifier of a transmit timing error group for each of the PRS resources that are configured. The first wireless device may identify one of the PRS resources that are configured, to be a reference PRS resource, and may indicate whether each of others of the PRS resources that are configured, is associated with the reference PRS resource.

In some embodiments, the first wireless device may receive positioning reference signal (PRS) resources according to an associated relationship of the PRS resources that comprises a timing relationship (e.g., an identifier of a timing error groups (TxTEG ID) per transmission/reception point (TRP)) or a spatial relationship (e.g., Quasi co location (QCL), transmission configuration indication (TCI)). The first wireless device may send the carrier phase measurement and an identifier of a receive timing error group (RxTEG ID) for each of the PRS resources to the second wireless device. The first wireless device may send the carrier phase measurement which may comprise: a first measurement for a reference PRS resource, and a difference value relative to the first measurement for each of others of the PRS resources, to the second wireless device.

In some embodiments, the first wireless device may send a capability of the first wireless device to support use of the carrier phase measurement to determine a position of the wireless device, to the second wireless device. The first wireless device may receive a request to determine the carrier phase measurement from the second wireless device. The carrier phase measurement comprises a difference in carrier phase values corresponding to the first positioning-related signal and the second positioning-related signal. The carrier phase measurement may comprise a first arrival time and a second arrival time corresponding to the first positioning-related signal and the second positioning-related signal, respectively, and the timing relationship or the spatial relationship being used by the first wireless device.

In some embodiments, the first wireless device may determine an assistance measurement according to the first positioning-related signal and the second positioning-related signal. The first wireless device may send the assistance measurement to the second wireless device. The assistance measurement may comprise a distance between a first antenna corresponding to the first positioning-related signal and a second antenna corresponding to the second positioning-related signal. The assistance measurement may comprise a geographical coordinate information of the first positioning-related signal and the second positioning-related signal.

At least one aspect is directed to a system, method, apparatus, or a computer-readable medium. A second wireless device (e.g., a base station (BS), a location management function (LMF), or a user equipment (UE)) may receive a carrier phase measurement. The carrier phase measurement can be determined with respect to a first positioning-related signal with a first carrier frequency, and a second positioning-related signal with a second carrier frequency, under a constraint of having a difference between the first carrier frequency and the second carrier frequency to be conformed against a defined value.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
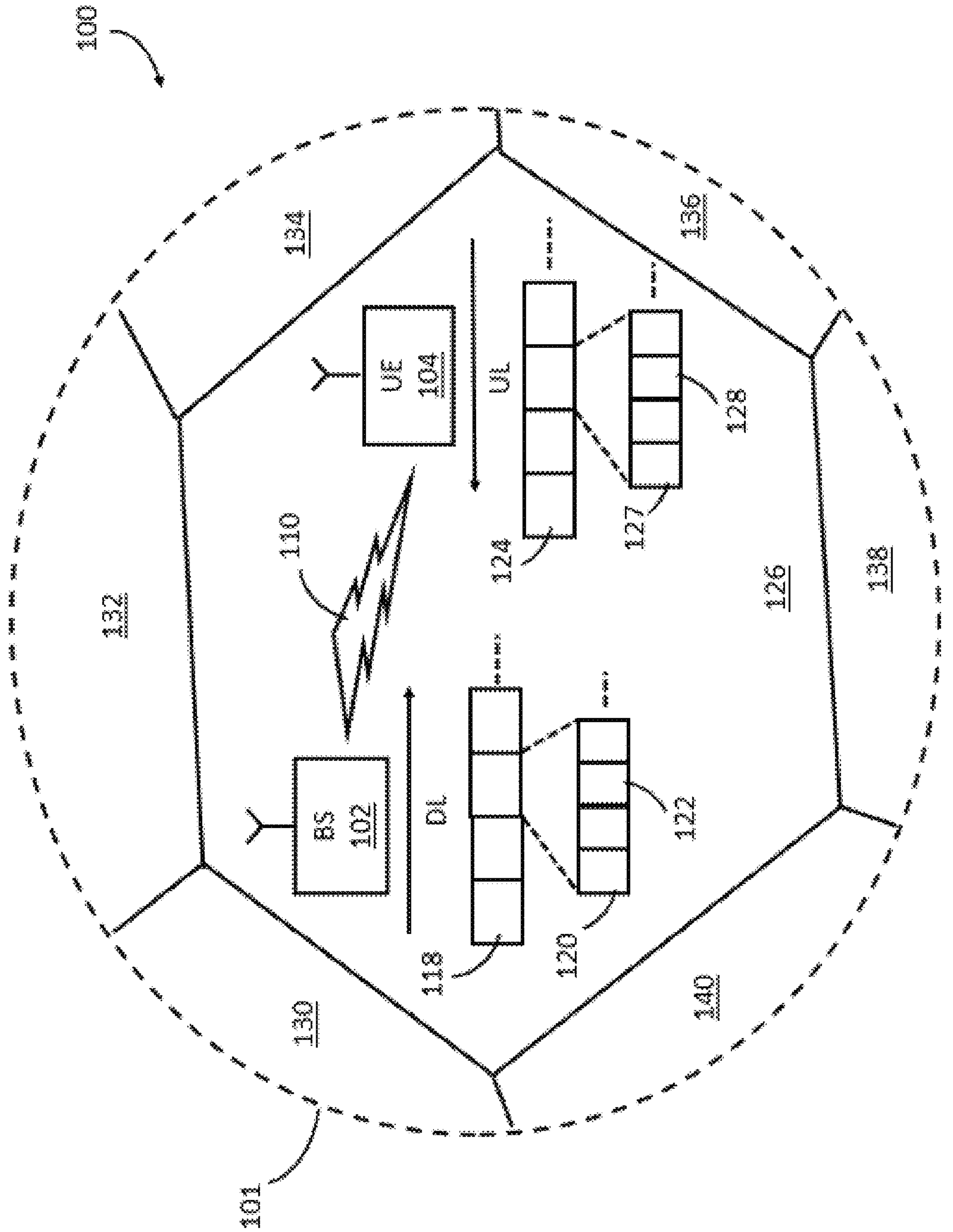
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
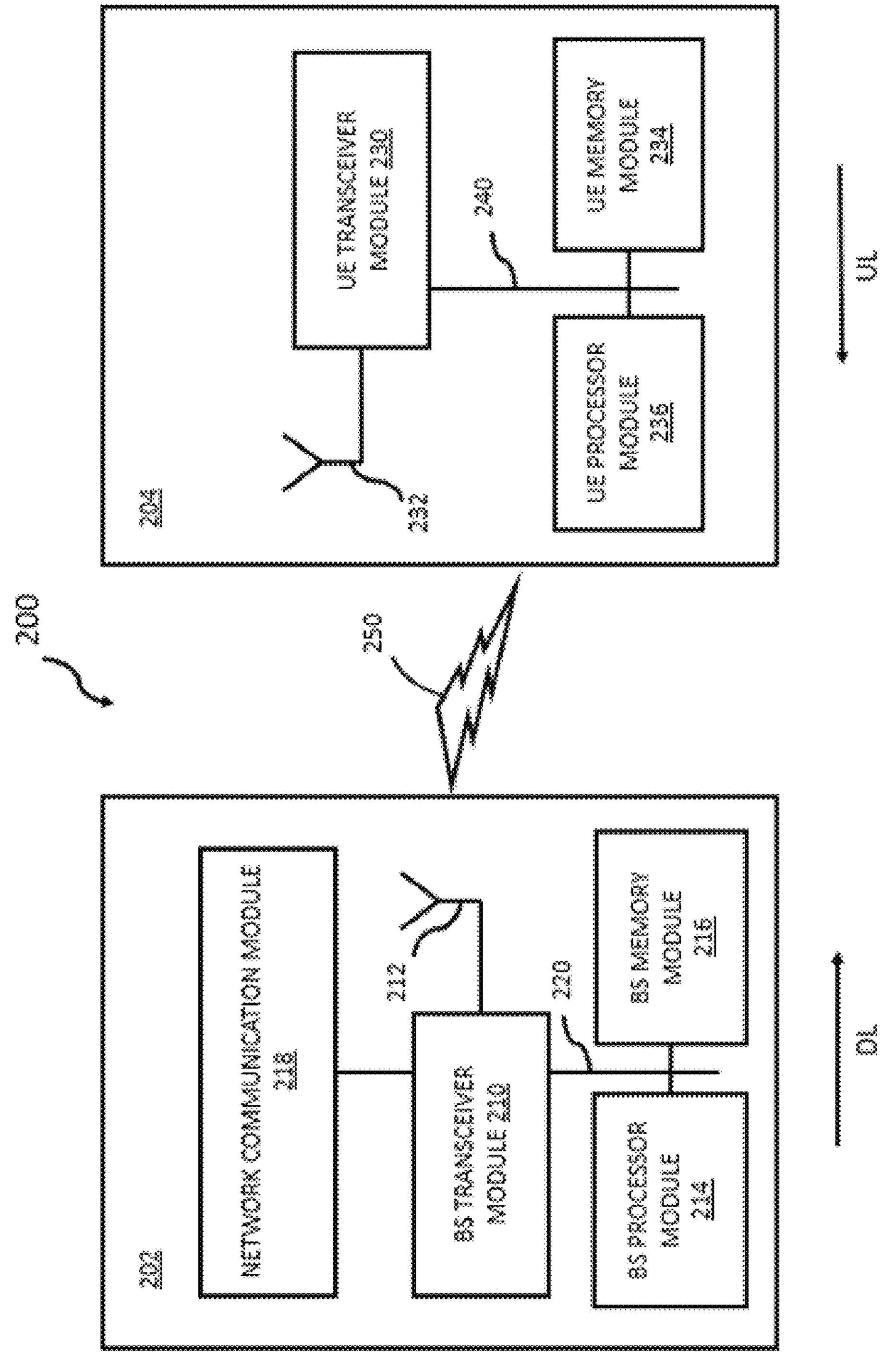
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Reference Signaling Design and Configuration

In 5G new radio (NR) system, different scenarios may have different requirements for positioning delay and accuracy. Systems and methods based on a carrier phase measurement (e.g., a phase difference between at least two signals) can improve positioning accuracy. In order to meet requirements of positioning accuracy, the systems and methods presented herein include novel approaches for positioning based on carrier phase measurement.

In positioning technology, supported positioning technologies can be at least one of: network-assisted Global Navigation Satellite System (GNSS) methods based on network-assisted global navigation and positioning technology, positioning based on observed time difference (OTDOA) of arrival (e.g., of long-term evolution (LTE) signals), new radio (NR) enhanced cell ID methods (NR E-CID) based on NR signals for instance, wireless local area network (WLAN) positioning, Bluetooth positioning, terrestrial beacon system (TBS) positioning, multi-round trip time positioning based on NR signals, downlink angle-of-departure (DL-AoD) based on NR signals, downlink time difference of arrival (DL-TDOA) based on NR signals, uplink time difference of arrival (UL-TDOA) based on NR signals, or uplink angle-of-arrival (UL-AoA) based on NR signals. Hybrid positioning of the above positioning techniques can be also supported.

Figure 3:
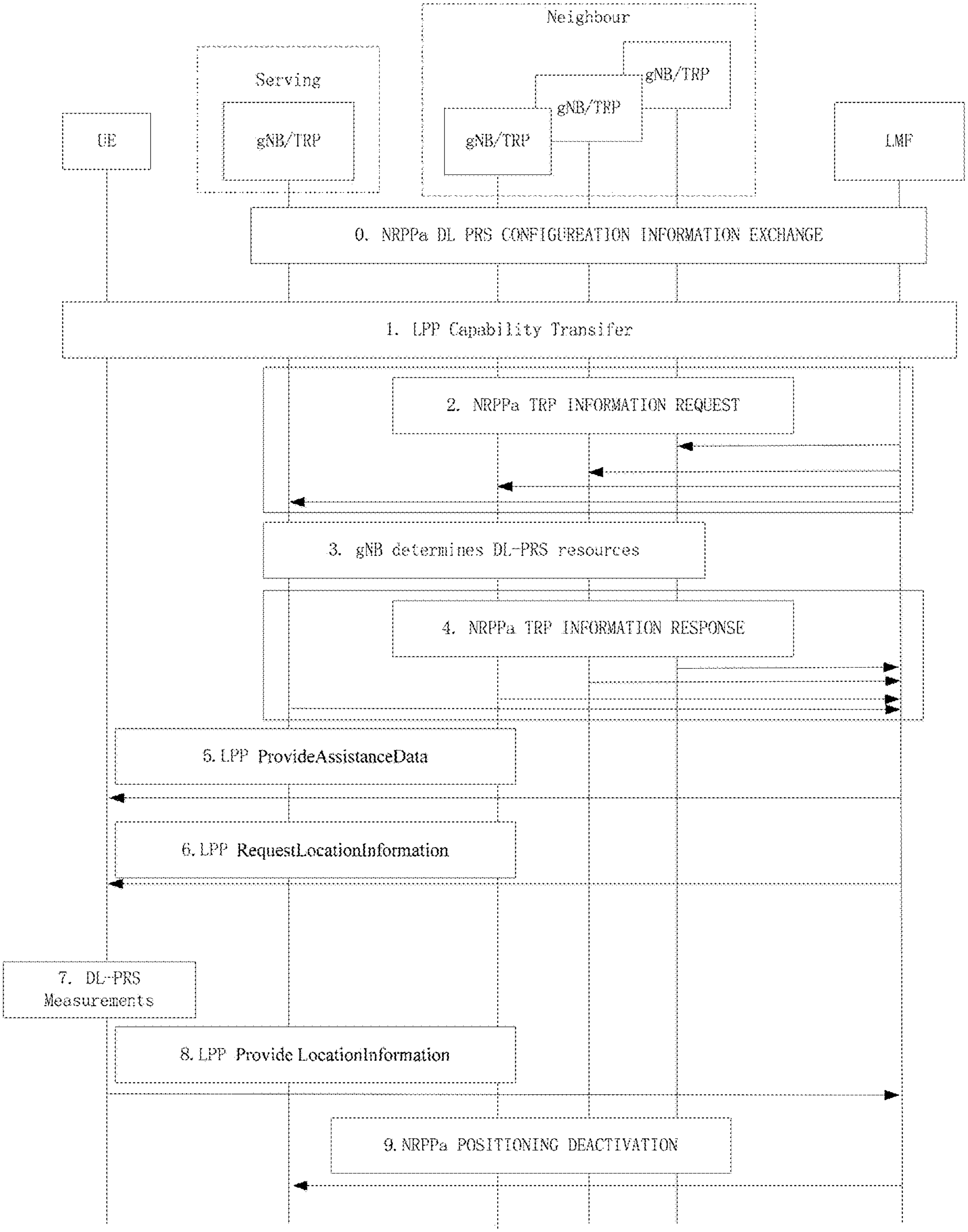
FIG. 3 illustrates an example positioning procedure of using downlink physical signals, in accordance with some embodiments of the present disclosure.
Figure 4:
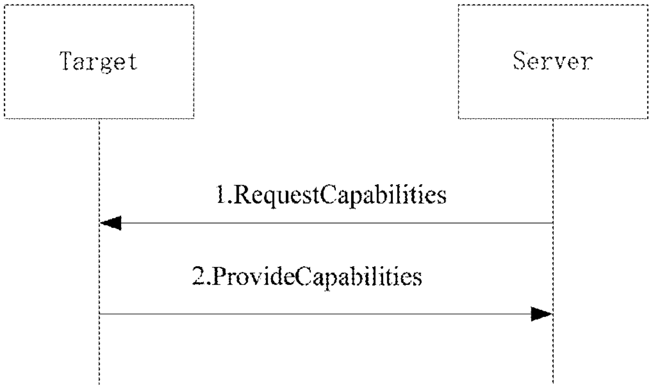
FIG. 4 illustrates an example procedure for LTE positioning protocol (LPP) capability transfer, in accordance with some embodiments of the present disclosure.
Figure 5:
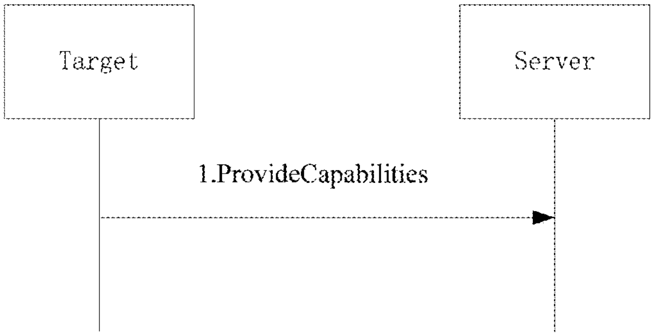
FIG. 5 illustrates an example procedure for LTE positioning protocol (LPP) capability indication, in accordance with some embodiments of the present disclosure.
Figure 6:
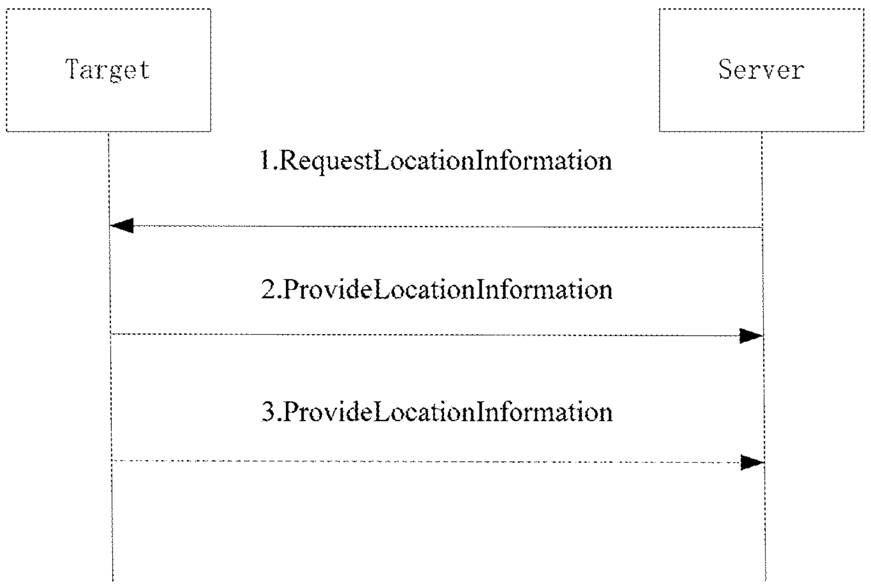
FIG. 6 illustrates an example procedure for LTE positioning protocol (LPP) location information transfer, in accordance with some embodiments of the present disclosure.

FIG. 1 illustrates an example positioning procedure of using downlink physical signal. FIG. 4 illustrates an example procedure for LTE positioning protocol (LPP) capability transfer. FIG. 5 illustrates an example procedure for LTE positioning protocol (LPP) capability indication. FIG. 6 illustrates an example procedure for LTE positioning protocol (LPP) location information transfer. The positioning procedure of using downlink physical signal may include one or more of the following steps (in any sequence). Step 0: A location management function (LMF) may use a procedure of transmission/reception point (TRP) information transfer operation from a gNB to the LMF to obtain the TRP information required for carrier phase measurements based positioning. Step 1: The LMF (e.g., server) may request a positioning capability of a target device (e.g., UE) using a LTE positioning protocol (LPP) capability transfer procedure (as shown in FIG. 4). Step 2: The LMF may send a NR positioning protocol A (NRPPa) TRP information request message to a serving gNB to request downlink positioning reference signal (DL-PRS) configuration information for the target device. Step 3: The serving gNB may determine the resources available for DL-PRS, and may configure the target device with the DL-PRS resource sets. Step 4: The serving gNB may provide the DL-SRS configuration information to the LMF in a NRPPa TRP information response message. Step 5: The LMF may send an LPP provide assistance data (e.g., assistance measurement) message to the target device with the DL-PRS resource sets. Step 6: The LMF may send an LPP request location information message to the target device to request carrier phase based a DL-AoD measurement (as shown in FIG. 6). Step 7: The target device may measure each gNB with the DL-PRS configured in step 5. Step 8: The target device may report the DL-PRS measurements for carrier phase based DL-AoD to the LMF in a LPP provide location information message (as shown in FIG. 6). Step 9: The LMF may send a NRPPa positioning deactivation message to the serving gNB to end the positioning procedure. In some embodiments, a LPP capability indication procedure may allow the target device to provide unsolicited capabilities to the LMF (e.g., server) (as shown in FIG. 3).

Figure 7:
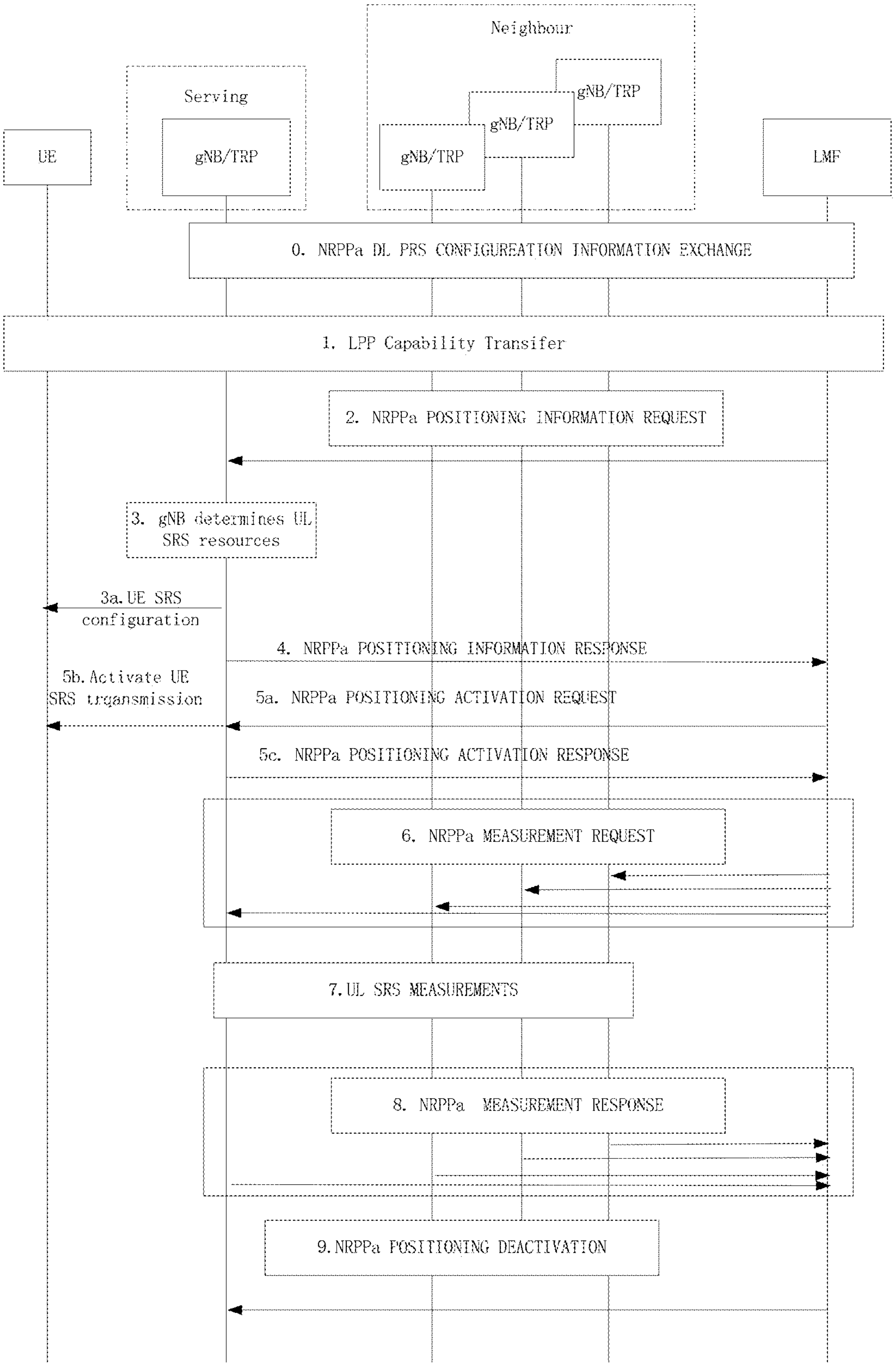
FIG. 7 illustrates an example positioning procedure for using uplink physical signals, in accordance with some embodiments of the present disclosure.

FIG. 7 illustrates an example positioning procedure for using uplink physical signals, in accordance with some embodiments of the present disclosure. The positioning procedure of using uplink physical signal may include following steps. Step 0: A location management function (LMF) may use the procedure transmission/reception point (TRP) information exchange operation to obtain the TRP information required for UL-AoA positioning. Step 1: The LMF may request the positioning capabilities of the target device using the LPP capability transfer procedure. Step 2: The LMF may send a NRPPa positioning information request message to the serving gNB to request uplink sounding reference signal (UL-SRS) configuration information for the target device. Step 3: The serving gNB may determine the resources available for UL-SRS and configure the target device with the UL-SRS resource sets in step 3*a*. Step 4: The serving gNB may provide the UL-SRS configuration information to the LMF in a NRPPa positioning information response message. Step 5: In the case of semi-persistent or aperiodic SRS, the LMF may request activation of UE SRS transmission by sending the NRPPa positioning activation request message to the serving gNB of the target device. The gNB may activate the UL-SRS transmission and can send the NRPPa positioning activation response message. The target device may begin the UL-SRS transmission according to the time domain behavior of UL-SRS resource configuration. Step 6: The LMF may provide the UL-SRS configuration to the selected gNBs in a NRPPa measurement request message. The message may include all information required to enable the gNBs/TRPs to perform the UL measurements. Step 7: Each gNB may be configured at step 6 measures the UL-SRS transmissions from the target device. Step 8: Each gNB may report the UL-SRS measurements to the LMF in a NRPPa measurement response message. Step 9: The LMF may send a NRPPa positioning deactivation message to the serving gNB.

In some embodiments, a target device can be a device that may be being positioned (e.g., UE or secure user plane location (SUPL) enabled terminal (SET)). A location server may be a physical or logical entity (e.g., evolved serving mobile location center (E-SMLC), SUPL location platform (SLP), or LMF) that may manage positioning for a target device by obtaining measurements and other location information from one or more positioning units and providing assistance data to positioning units to help determine location information. A Location Server may also compute or verify a final location estimate.

In a DL-AoD method, a UE position can be estimated according to a reference signal received power (RSRP) of a downlink positioning reference signal (PRS), which can be obtained by measuring the downlink signals from multiple NR TRPs by the UE. For a UE-based mode, the UE may need to have spatial information of the downlink signals and geographic coordinates of the TRPs.

In some embodiments, UL-AoA can be measured based on a SRS-RSRP, or based on a multiple signal classification (MUSIC) algorithm. In a UL-AoA positioning method, a LMF may send a positioning request to a gNB. The LMF may determine a positioning algorithm using UL-AoA according to a quality of service (QOS) of the positioning request and capabilities of a NG-RAN node and a UE. In order to perform an uplink measurement, the TRP may need to be informed characteristics of the SRS signal transmitted by the UE within the measurement period to calculate the uplink measurement. These features can be static. Therefore, the LMF may indicate to the serving gNB to make the UE transmit SRS for uplink positioning. However, the gNB may determine allocated resources and inform the LMF of measurement results so that the LMF can configure several TRPs participating in the positioning. The gNB may report the measurement results to the LMF. The LMF may use the measurement results and/or other assisted positioning information to estimate the position of the UE, and may report the positioning results to the UE.

Carrier phase techniques may use a carrier phase of a measured signal to extract/determine propagation distance information. Under line of sight (LoS) conditions, a carrier phase measurement error can be a fraction of a wavelength number and can be on an order of centimeters. Line of sight (LoS) can be a type of propagation that can transmit and receive data only where transmit and receive stations can be in view of each other without any sort of an obstacle between stations. The wavelength λ may correspond to a phase difference of 2πradians, for all waves. However, carrier phase measurements may include integer ambiguity of location. A distance between a user and a base station can be calculated in wavelengths, including integer and fractional parts. In the positioning algorithm, a range of phase measurement is 0~2π. Only the fractional part of the distance can be measured, which may bring a problem of integer multiple ambiguity.

For carrier phase based positioning, the target device may measure the carrier phases $$P_a^i,$$

ToA $$T_a^i$$

of the two TRPs served by one gNB. Then $$T_a^i \text{ and } P_a^i$$

can be expressed as follows $$T_a^i = r_a^i + c\,(b_r - b_t) + w_{a,T}^i \tag{1}$$

$$\lambda P_a^i = r_a^i + c\,(b_r - b_t) + \lambda N_a^i + w_{a,P}^i \tag{2}$$

where $$T_a^i$$

can be expressed in meters, $$r_a^i$$

can be the geometric distance between the transmitter and the receiver, c can be the speed of light, $b_r$ and $b_t$ can be respectively the receiver and transmitter clock offsets, $$P_a^i$$

can be expressed in cycles, λ can be the wavelength of carrier frequency of DL-PRS, $$N_a^i$$

can be the unknown integer ambiguity, $$w_{a,T}^i$$

can be TOA measurement errors, containing multipath and measurement noise, and $$w_{a,P}^i$$

can be the phase measurement errors, containing phase multipath and phase noise.

In order to reduce the search space for integer ambiguity, the 'virtual phase measurement' with the 'virtual wavelength' may be introduced. The purpose can be to have the 'virtual wavelength' be much longer than the wavelength for the carrier phase positioning reference signal (PRS) carrier by taking the advantage that the network may have the control of the transmission of the PRS. Instead of transmitting the PRS with one single frequency only, the transmitter may transmit PRS signals in two or more frequencies to get phase measurements from multiple frequencies. The long 'virtual wavelength' for 'virtual phase measurement' may be created by a special combination of these phase measurements.

For two TRPs, target device can obtain:

$$T = r + c(b_r - b_t) + w_T \quad (3)$$

$$\lambda_1 P_1 = r + c(b_r - b_t) + \lambda_1 N_1 + w_{P1} \quad (4)$$

$$\lambda_2 P_2 = r + c(b_r - b_t) + \lambda_2 N_2 + w_{P2} \quad (5)$$

Multiplying both sides of Equation (5) with $\lambda_2/(\lambda_2-\lambda_1)$ and Equation (6) with $-\lambda_1/(\lambda_2-\lambda_1)$, and then combining them together, the following 'virtual' phase measurement $P_v$ may be obtained:

$$\lambda_v P_v = r + c(b_r - b_t) + \lambda_v N_v + w_v \quad (6)$$

where $\lambda_v$, $N_v$, and $w_v$ are, respectively, the 'virtual' wavelength, the integer ambiguity for 'virtual' phase measurement and 'virtual' phase measurement errors, which can be expressed as follows.

$$\lambda_v^{-1} = \lambda_1^{-1} - \lambda_2^{-1} \quad (7)$$

$$P_v = P_1 - P_2 \quad (8)$$

$$N_v = N_1 - N_2 \quad (9)$$

$$w_v = (\lambda_2 w_{P1} - \lambda_1 w_{P2})/(\lambda_2 - \lambda_1) \quad (10)$$

In the procedure of TRP information transfer, the frequency parameters of the TRP is in a NRPPa TRP information request can partially be listed/represented in the following example:

```
TRPInformationTypeItemTRPReq NRPPA-PROTOCOL-IES ::= {
  { ID id-TRPInformationTypeItem    CRITICALITY reject      TYPE
TRPInformationTypeItem    PRESENCE mandatory },
  ...
}
TRPInformation TypeItem ::= ENUMERATED {
      nrPCI,
      nG-RAN-CGI,
      arfcn,
      pRSConfig,
      sSBInfo,
      sFNInitTime,
      spatialDirectInfo,
      geoCoord,
      ...,
      trp-type
}
```

In the procedure of assistance data transfer, the LMF may provide DL-PRS configuration for a target device, and the absolute frequency DL-PRS may be listed/represented in the following example:

```
NR-DL-PRS-AssistanceDataPerTRP-r16 ::= SEQUENCE {
  nr-ARFCN-r16     ARFCN-ValueNR-r15     OPTIONAL,     -- Need ON
  ...,
}
```

Implementation Example 1

In some embodiments, a first wireless device (e.g., UE or BS) may receive a first positioning-related signal with a first carrier frequency and a second positioning-related signal with a second carrier frequency. The first wireless device may determine a carrier phase measurement (e.g., phase difference between at least two signals) with respect to the first positioning-related signal and the second positioning-related signal, under a constraint of having a difference between the first carrier frequency and the second carrier frequency to be conformed against a defined value. The first wireless device may send the carrier phase measurement to a second wireless device (e.g., BS, LMF, or UE).

In order to support carrier phase based positioning, a parameter of capability of carrier phase based positioning may be included to support use of the carrier phase measurement to determine a position of the first wireless device. The parameter may support carrier phase measurement in a capability parameter and a capability request. In order to support a virtual carrier wave measurement, and reduce complexity of searching integer ambiguity, a LMF can request a gNB to configure the parameter ARFCN with a constraints for DL PRS resource. For example, the LMF can make sure a difference of the first carrier frequency f1 and the second carrier frequency f2 of two DL-PRS resources may be configured to satisfy one or more constraints or conditions: f1−f2≥B or f1−f2≈B. The defined value, B, may comprise bandwidth of a positioning reference signal (PRS) of the first positioning-related signal or the second positioning-related signal. For example, in LPP provide assistance data message, "ARFCN" can be associated to the carrier frequency of the positioning frequency layer (PFL). The constraint can be f1−f2=ARFCN 1−ARFCN 2≥B, or ARFCN 1−ARFCN 2≈B. In certain embodiments, the defined value can be the larger bandwidth of the two frequency layers. The defined value may reduce the search space of integer ambiguity.

In a UE-assistant or a LMF-based mode, the LMF can estimate the UE's position coordinates by combining the measurement results with the carrier frequency/wavelength and the position coordinates reported by the gNB. In a UE-based mode, there may be no need to report the measurement results to the LMF, and the UE may estimate position of the UE by combining position coordinates of the gNB forwarded by the LMF and the carrier frequency/wavelength.

In some embodiments, for a LPP location information transfer procedure, a parameter of DL-CarrierPhase-RequestLocationInformation may be included in the RequestLocationInformation parameter. In some embodiments, ProvideLocationInformation parameter can used by a target device to provide carrier phase measurements to a LMF. ProvideLocationInformation parameter may be used to provide NR DL-CarrierPhase positioning specific error reason. P1 and P2 can be carrier phases of two positioning frequency layers measured by the UE and/or target device. In some embodiments, the P1 and P2 can be phase difference of two positioning frequency layers, that can be from, a virtual carrier phase measurement Pv, an arrival of the PRS of the two positioning frequency layers time ToA (or time difference of arrival deltaToA), or a beam index/RxTEG ID used by the UE/target device.

In some embodiments, the UE may use N receiving timing error groups (RxTEGs) (the UE may have the capability and send a measurement to the LMF in the capability transfer) to receive the positioning reference signal (PRS) transmitted by the same TRP. The UE may measure a carrier phase and a time of arrival (ToA), and may report the measurement to the LMF.

For uplink carrier phase reference signal positioning, positioning information request may be used by the LMF to request a NG-RAN node to configure the target device with SRS configuration. The requested SRS transmission characteristics can be included in the positioning information request, which may include a carrier frequency and a bandwidth of SRS.

The LMF may request the NG-RAN node to configure the UE to use different transmission frequencies f1 and f2 in two frequency layers to send SRS resource, where f1−f2≥B, or the size of f1−f2 is similar to B, B is the larger bandwidth of the two SRS resources. The UE may use M TxTEGs (the UE may have the capability and send a measurement to the LMF in the capability transfer) to transmit sounding reference signals (SRS) to the same TRP. The gNB may use the same TRP to receive these 2 SRS resources. The gNB may measure a carrier phase and a time of arrival ToA, and may report the measurement to the LMF. The two TRPs of each TRP/gNB may use the same TRP RxTEG or beam index to measure the phase (or phase difference w) or the corresponding arrival time (or arrival time difference) of the SRS resource.

The carrier phases/carrier phased difference measured using two TRPs/antenna elements/antenna panels may be reported in the NRPPa measurement response message to the LMF. The time of arrival of the two TRPs/antenna elements/antenna panels may be also in the NRPPa measurement response message. In order to help the LMF calculate a final position of the target device, the distance of the two TRPs/antenna elements/antenna panels can be also in the NRPPa measurement response message.

Implementation Example 2

In order to improve accuracy of carrier phase measurement, especially to solve the problem of integer multiple ambiguity. In some embodiments, virtual carrier wavelengths can be used. The virtual carrier wavelength may require/involve at least two different carrier frequencies to transmit the same PRS resources. The LMF may combine the two TRPs of the two carriers for carrier aggregation (CA). In the NR positioning protocol A (NRPPa) positioning information request message, the LMF may request that the carrier frequencies of the two TRPs of the two component carrier transmitting DL-PRS be f1 and f2 respectively, where f1−f2≥B, or f1−f2 is close to B. B is the larger of the PRS bandwidths transmitted in the two TRPs. After receiving the response from the gNB, the LMF may forward configuration messages of f1 and f2 to the UE. LMF may request the UE to use the same receive beam index/RxTEG ID to receive the PRS signals on the two component carriers (CCs) or positioning frequency layers (PFLs).

In the UE-assisted/LMF-based mode, the parameters reported by the UE can be at least one of: carrier phases P1 and P2 of the two CCs measured using the same beam (or the phase difference, that can be, the virtual carrier phase measurement Pv), an arrival of the PRS of the two CCs UE's time ToA (or time difference of arrival deltaToA), a beam index/RxTEG ID used by the UE. The UE may report these measurement results to the LMF, and the LMF can estimate the distance from the UE to the gNB by combining the measurement results with the coordinates of the TRPs of the two CCs (reported to the LMF by the gNB). The LMF may send the location coordinates to the UE (via the Location Services Reply message). In the UE-based mode, the UE may not need to report the above parameters. The LMF may transmit the location coordinates of the TRP to the UE, and the UE can estimate final location coordinates of the UE.

For the uplink carrier phase positioning algorithm, the LMF may combine two carriers for carrier aggregation (CA) for one UE. In the NRPPa positioning information request message, the LMF may request NG-RAN node to configure SRS resources for one UE to transmit in two carrier frequencies be f1 and f2 respectively, where f1−f2≥B, or f1−f2 is close to B (e.g., within 5% or 10%). B is the larger of the SRS bandwidths transmitted by the UE. After receiving the response from the TRP/gNB served by the NG-RAN node, the LMF may forward the configuration messages of f1 and f2 to the UE. In some embodiments, the LMF may request the TRP/gNB to use the same receive beam index/RxTEG ID to receive the SRS signals on the two CCs. The parameters reported by the TRP/gNB to the LMF may include at least one of: carrier phases P1 and P2 measured by the TRP/gNB on the two CCs using the same beam index/RxTEG ID (or the phase difference, that is, the virtual carrier phase measurement Pv), an arrival time ToA of the SRS of the two CCs from the UE (or time difference of arrival deltaToA), a beam index/RxTEG ID used by TRP/gNB. The LMF can estimate the location of the UE by combining the measurement information reported by the TRP/gNB and other auxiliary information sent by the TRP/gNB to the LMF.

Implementation Example 3

Figure 8:
FIG. 8 illustrates an example procedure for two positioning reference signal (PRS) in two parts of a bandwidth, in accordance with some embodiments of the present disclosure.
Figure 9:
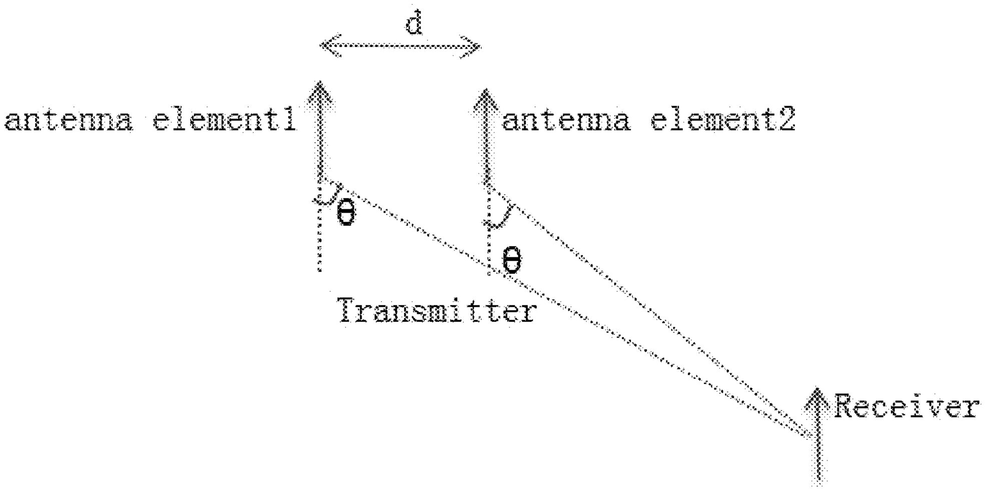
FIG. 9 illustrates an example approach for using carrier phase difference to derive angle of departure (AoD), in accordance with some embodiments of the present disclosure.
Figure 10:
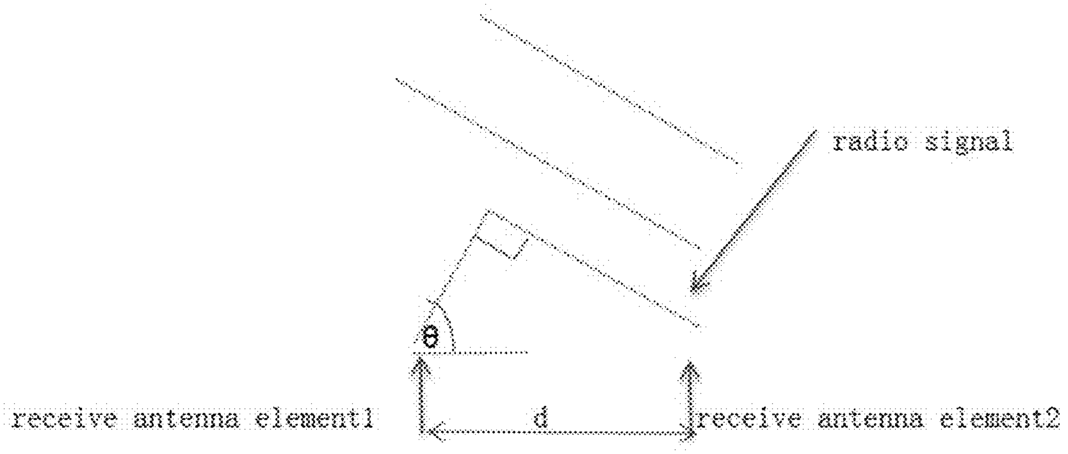
FIG. 10 illustrates an example approach for using carrier phase difference to derive angle of arrival (AoA), in accordance with some embodiments of the present disclosure.

In downlink positioning, after receiving the positioning request by a LMF, the LMF may send a TRP information request to a gNB. The request message may include the configuration information of PRS and subcarrier spacing (SCS) indices of the two PRS resources where the PRS can be located to ensure that a gap between the two PRS resources is close to the transmission bandwidth of the two PRS resources as is shown in FIG. 8. The gNB may response to the LMF to confirm the PRS configuration message. The SCS indices of the PRS resource may be included in the message, and the LMF may forward the PRS configuration message to the UE. The UE may use same RxTEG to receive the PRS transmitted by the gNB, and may measure the carrier phase (p1 and p2 correspond to the two carrier phases of the two PRS resources in the two parts of the bandwidth, or the carrier phase difference, that can be, the virtual carrier phase Pv=p1−p2) and the arrival time ToA, and may report to the LMF. LMF may use the measurement results to estimate the location of the UE and may forward a location report to the UE.

In uplink positioning, after receiving the positioning request by a LMF, the LMF may send a positioning information request to the serving gNB/TRP. The request message may include the configuration information of the SRS and the SCS indices where the SRS resources can be located to ensure that the target device or UE transmits the SRS resources at the two parts of the system bandwidth. If the gNB/TRP replies to the LMF to confirm the SRS configuration message, the LMF may forward the SRS configuration message to the other neighbor gNBs/TRPs. The UE may transmit the SRS resource to the gNBs/TRPs, and each gNB/TRP may measure the carrier phase (p1 and p2 correspond to the two carrier phases of the two SRS resources in the two parts of the bandwidth, respectively, or the carrier phase difference, that can be, the virtual carrier phase Pv=p1−p2) and arrival time ToA, and may report the measurements to LMF. The LMF may use the measurement information reported by the gNBs/TRPs to estimate the location of the UE, and if necessary, the LMF may forward the final location information to the UE.

In order to simplify the procedure in UE, LMF can request a gNB/TRP to configure the PRS/SRS resources with same SCS indices across different component carrier or positioning frequency layers or in different parts within a same component carrier or positioning frequency layer. If the SCS indices of the PRS/SRS resource are the same, the UE can report a difference of the measurement results (e.g., carrier phase, RSRP, or ToA).

Implementation Example 4

When a UE measures reference signals of multiple resources transmitted by TRPs/gNBs from multiple positioning frequency layers (PFLs) or component carriers (CCs), the same beam ID (e.g., RxTEG) can be used for reception. In a capability transfer procedure, a target device may use IE/UE measurement capability to indicate a capability of using same UE RxTEG or same beam index to receive, and may measure associated DL-PRS resources from different component carrier or positioning frequency layers, or from different parts within a same component carrier or positioning frequency layer.

In order to ensure timing errors can be same between different transmitters and/or receivers. In the TRP information transfer procedure, a LMF may request a NG-RAN node to use an associated relationship of positioning reference resources (PRS), in a group of PRS that can be configured, to transmit DL PRS resources in different component carriers or positioning frequency layers, or in different parts within a same component carrier or positioning frequency layer. The associated relationship may comprise a timing relationship (e.g., TxTEG IDs per TRP) or a spatial relationship (e.g., Quasi co location (QCL), transmission configuration indication (TCI)). In the TRP information response message, the NG-RAN node may provide a timing relationship (e.g., TxTEG ID) or a spatial relationship (e.g., QCL, TCI) per PRS resource set of each TRP for different component carriers or positioning frequency layers, or in different parts within a same component carrier or positioning frequency layer. The NG-RAN node can choose/select/determine a TRP as a reference TRP, and can use one parameter (e.g., one bit) to indicate whether there are associated relationship among the TRPs in different component carriers or positioning frequency layers. In the assistance data transfer procedure, the LMF may forward/transmit such configuration information to a target device.

In a location information transfer procedure, the LMF may send a request location information message to request a target device to measure associated PRS resources (e.g., resources of one or more PRSes or scheduled for the one or more PRSes) with associated/same UE RxTEG across different component carriers or positioning frequency layers, or in different parts within a same component carrier or positioning frequency layer. The associated PRS resources can be the PRS resources sent by TRPs using associated TxTEG IDs, QCL, TCI, or spatial relationship. The TRP TxTEG IDs across different component carriers or positioning frequency layers can be the same. The target device may use associated RxTEG IDs/QCL/TCI, or spatial relationship to receive and measure DL PRS resources across different component carriers or positioning frequency layers, or in different parts within a same component carrier or positioning frequency layer. In the provided location information message, the target device may provide measurements results (e.g., timing, RSRP, or carrier phase) together with the UE RxTEG ID (or QCL/TCI/spatial direction information) for each TRP to the LMF. The target device can choose/select/determine a TRP as a reference TRP. The difference in measurements between the reference TRP and other TRPs can be reported to the LMF.

The method and/or procedure mentioned above can be used for all positioning method using DL PRS measurement(s), such as DL-TDOA, Multi-RTT, and so on. For uplink positioning method (SRS transmission), UE can be requested using an associated timing relationship or spatial relationship. "Associated" may mean the timing relationship or spatial relation information of the different component carriers or positioning frequency layers, or in different parts within a same component carrier or positioning frequency layer can be the same. The UE TxTEG can be requested or provided to the gNB/TRP. The LMF may request the gNB/TRP to measure associated SRS resources (or SRSes) using associated TRP RxTEG.

LMF can request a gNB/TRP to configure the PRS/SRS resource with same SCS indices across different component carrier or positioning frequency layers. If the SCS indices of the PRS/SRS resource are the same, UE can report a difference of the measurement results (e.g., carrier phase, RSRP, or ToA).

Implementation Example 5

In a DL-AoD positioning method, a UE position can be estimated according to a carrier phase of a downlink PRS, which can be obtained by the UE measuring the downlink signals from multiple NR TRPs. For the UE-based mode, the UE may need to have a spatial information of a downlink signal and geographic coordinates of the TRP.

In the DL-AoD positioning method, the departure angle is:

$$\theta = \arcsin\left(\frac{\psi\lambda}{2\pi d}\right) \tag{12}$$

In the above formula, d can be the distance between the two antenna ports/panels/elements/array of the PRS resource from one gNB/TRP, $\lambda$ can be the carrier wavelength, and $\psi$ can be the phase difference between the two antenna ports/panels/element/array, which can be obtained by complex correlation in practice. In formula (12), the departure angle and the carrier phase difference may have a trigonometric relationship.

In the present disclosure, a method of calculating the departure angle based on the carrier phase difference measurement and reporting in combination with the distance of the transmitting antenna and the carrier wavelength and then performing the position calculation can be adopted. Specifically, gNB/TRP can be requested by LMF to use associated relationship to transmit PRS resources within one PRS resource set or different PRS resource sets, wherein the relationship can be timing relationship (e.g., TxTEG) or spatial relationship (e.g., QCL, TCI). The UE may use the same RxTEG to receive PRSs transmitted from two antenna ports/antenna panels/antenna elements/antenna arrays of the same TRP, where each antenna element may correspond to one PRS resource. The UE may calculate the carrier phase difference $\psi$ according to the received PRS, for example, a complex correlation method can be used. The resolution of the phase difference can be 0.1 degrees (not more than 0.1 degrees, and can be finer.), and the value (0~3599) reported by the gNB to the LMF may have a mapping relationship with the phase difference.

In the method based on carrier phase measurement positioning described in the present disclosure, the UE and LMF may use the LPP capability transfer procedure to exchange the capability of carrier phase measurement. In the UE-assisted or LMF-based mode, the UE may need to report the carrier phase difference in the LPP provide location information to the LMF. After the LMF receives the carrier phase difference, the LMF may calculate a distance d according to the coordinates of the antenna port/antenna panel/antenna element/antenna array reported by the gNB to the LMF, and may combine carrier wavelength λ to calculate the departure angle θ. After the LMF obtains/determines the departure angles of at least three TRPs, the current position of the UE can be estimated by combining the position information of the TRPs.

In the UE-based mode, the UE may not need to report a carrier phase difference to the LMF. The LMF may send the coordinates of two port/antenna panel/antenna element/antenna array (UE may calculate distance d according to the coordinate information) or distance d to UE, or pre-agreed/pre-configured the pattern of port/antenna panel/antenna element/antenna array. Each pattern may correspond to one distance d, and the LMF may send the coordinate information of three TRPs to the target UE. The unit of distance d can be in meters for instance.

Since the carrier phase is the accumulation of the carrier frequency in time, the UE can calculate the phase difference according to the arrival time difference (deltaT), or the UE may report the timestamps of the received PRSs of the two antennas.

To support this algorithm, some parameters may need to be added, which are shown in Table 1 and 2. Table 1 illustrates information that may be transferred from the LMF to the UE. Table 2 illustrates information that may be transferred from the UE to the LMF.

TABLE 1

| Information | UE-assisted | UE-based |
|---|---|---|
| The distance d between the two antenna ports/pannels/elements/array of the TRP transmitting the PRS resource | No | Yes |

TABLE 2

| Information | UE-assisted | UE-based |
|---|---|---|
| The carrier phase or phase difference Ψ of the PRSs for the three TRPs measured by the UE | Yes | No |

Implementation Example 6

In a carrier phase based UL-AoA positioning algorithm, multiple TRPs may receive an uplink positioning reference signal from a UE, and may measure the angle of arrival (horizontal angle of arrival and/or vertical angle of arrival). The gNB serving the TRPs may report the measured angle of arrival to the LMF. Using the assistance data from the positioning server, combined with the measurement results and other configuration information, the position of the UE can be estimated. The AoA measured by the TRPs can be reported to the LMF, and the LMF may calculate the position coordinates of the target UE according to the measurement results, combined with the position coordinates of the gNB and other information. The LMF may send the position coordinates to the UE.

In some embodiments, the UE may send an SRS resource, and the two TRPs of each gNB can use the same beam direction/RxTEG to measure the phase (or phase difference ψ) or the corresponding arrival time (or arrival time difference) of the SRS resource, and may report it to the LMF. The parameter that the TRP/gNB may need to report to the LMF can be/include the distance d between two RPs, or the antenna array pattern of the TRP/gNB. According to the reported measurement results, the distance d between the RPs reported by the TRP/gNB (or the LMF may calculate the distance based on the antenna array pattern reported by the TRP/gNB), combined with the carrier frequency wavelength, using equation (13), LMF can calculate get the angle of arrival. In this way, the LMF may collect the angles of arrival of at least three TRP/gNBs, and can estimate the position coordinates of the UE according to the coordinates reported by the three TRP/gNBs. If the positioning request is sent by the UE, the LMF may send the positioning result to the UE.

$$\theta = \arccos\left(\frac{\psi\lambda}{2\pi d}\right) \tag{13}$$

The parameters may need to be added are shown in Table 3 and 4. Table 3 illustrates assistance data that may be transferred from the gNB to the LMF. Table 4 illustrates measurement results that may be transferred from the gNBs to the LMF.

TABLE 3

| Information |
|---|
| Distance d between 2 RPs/antennas receiving SRS |

TABLE 4

| Measurement results |
|---|
| The phase difference corresponding to the SRS from the UE measured by the gNB/TRP (at least 3 gNB/TRP measurements).<br>Phase (or ToA) of the received SRS<br>Beam index/TRP RxTEG of gNB/TRP receiving SRS |

Figure 11:
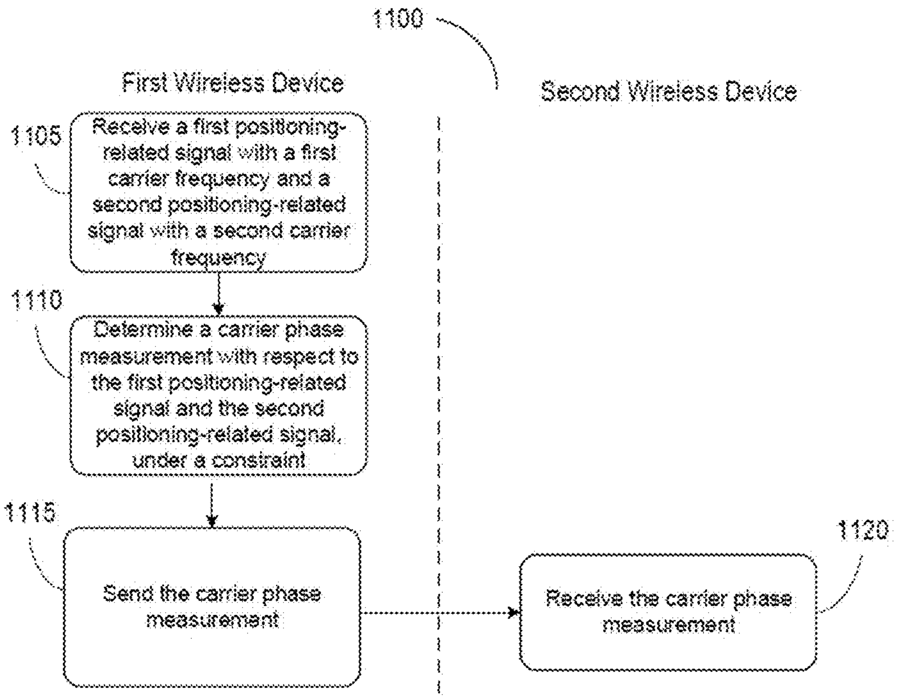
FIG. 11 illustrates a flow diagram of an example method for reference signaling design and configuration, in accordance with an embodiment of the present disclosure.

FIG. 11 illustrates a flow diagram of a method 1100 for reference signaling design and configuration. The method 1100 may be implemented using any of the components and devices detailed herein in conjunction with FIGS. 1-10. In overview, the method 1100 may include determining a carrier phase measurement (1110) with respect to a first positioning-related signal and a second positioning-related signal under a constraint.

Referring to (1105), and in some embodiments, a first wireless device (e.g., UE or BS) may receive a first positioning-related signal with a first carrier frequency and a second positioning-related signal with a second carrier frequency.

Referring to (1110), and in some embodiments, the first wireless device may determine a carrier phase measurement (e.g., phase difference between at least two signals) with respect to the first positioning-related signal and the second positioning-related signal, under a constraint/condition/scenario of having a difference between the first carrier frequency and the second carrier frequency to be conformed against a defined value. The carrier phase measurement may comprise beam indices corresponding to the first positioning-related signal and the second positioning-related signal. At least one of the first positioning-related signal or the second positioning-related signal each may comprise: a sounding reference signal (SRS), or a positioning reference signal (PRS).

Referring to (1115), and in some embodiments, the first wireless device may send the carrier phase measurement to a second wireless device (e.g., BS, LMF, or UE).

In some embodiments, the difference between the first carrier frequency and the second carrier frequency may be configured to be at least one of: equal to a defined value, greater than the defined value, or smaller (e.g., slightly smaller) than the defined value. The defined value may comprise a bandwidth of a positioning reference signal (PRS) of the first positioning-related signal or the second positioning-related signal (e.g., the larger bandwidth of two positioning frequency layers). The carrier phase measurement may comprise absolute values or difference values, in different component carriers or positioning frequency layers, or in different parts within a same component carrier or positioning frequency layer. Positioning reference signal (PRS) resources configured in different component carriers or positioning frequency layers may have a same subcarrier spacing (SCS) indices.

In some embodiments, the first wireless device may comprise a user equipment (UE) or a base station (BS). The second wireless device may comprise a base station (BS), a location management function (LMF), or a user equipment (UE). In some embodiments, the first wireless device may indicate an associated relationship of positioning reference signal (PRS) resources, in a group of PRS resources that are configured. The wireless device may receive a request to use the associated relationship to transmit the PRS resources in different component carriers or positioning frequency layers, from the second wireless device. The wireless device may receive a request to use the associated relationship to transmit the PRS resources in different parts (e.g., at different/opposite ends/extremes) within a same/single component carrier or positioning frequency layer. The associated relationship may comprises a timing relationship (e.g., an identifier of a timing error groups (TxTEG ID) per transmission/reception point (TRP)) or a spatial relationship (e.g., quasi co-location (QCL), transmission configuration indication (TCI)).

In some embodiments, the first wireless device may indicate an identifier of a transmit timing error group for each of the PRS resources that are configured. The first wireless device may identify one of the PRS resources that are configured, to be a reference PRS resource, and may indicate whether each of others of the PRS resources that are configured, is associated with the reference PRS resource.

In some embodiments, the first wireless device may receive positioning reference signal (PRS) resources according to an associated relationship of the PRS resources that comprises a timing relationship (e.g., an identifier of a timing error groups (TxTEG ID) per transmission/reception point (TRP)) or a spatial relationship (e.g., Quasi co location (QCL), transmission configuration indication (TCI)). The first wireless device may send the carrier phase measurement and an identifier of a transmit timing error group (TxTEG ID) for each of the PRS resources to the second wireless device. The first wireless device may send the carrier phase measurement which may comprise: a first measurement for a reference PRS resource, and a difference value relative to the first measurement for each of others of the PRS resources, to the second wireless device.

In some embodiments, the first wireless device may send a capability of the first wireless device to support use of the carrier phase measurement to determine a position of the wireless device, to the second wireless device. The first wireless device may receive a request to determine the carrier phase measurement from the second wireless device. The carrier phase measurement can comprise a difference in carrier phase values corresponding to the first positioning-related signal and the second positioning-related signal. The carrier phase measurement may comprise a first arrival time and a second arrival time corresponding to the first positioning-related signal and the second positioning-related signal, respectively, and the timing relationship or the spatial relationship being used by the first wireless device.

In some embodiments, the first wireless device may determine an assistance measurement according to the first positioning-related signal and the second positioning-related signal. The first wireless device may send the assistance measurement to the second wireless device. The assistance measurement may comprise a distance between a first antenna corresponding to the first positioning-related signal and a second antenna corresponding to the second positioning-related signal. The assistance measurement may comprise a geographical coordinate information of the first positioning-related signal and the second positioning-related signal.

Referring to (1120), and in some embodiments, a second wireless device (e.g., a base station (BS), a location management function (LMF), or a user equipment (UE)) may receive a carrier phase measurement. The carrier phase measurement can be determined with respect to a first positioning-related signal with a first carrier frequency, and a second positioning-related signal with a second carrier frequency, under a constraint of having a difference between the first carrier frequency and the second carrier frequency to be conformed against a defined value.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

receiving, by a first wireless device, a first positioning-related signal with a first carrier frequency and a second positioning-related signal with a second carrier frequency;

determining, by the first wireless device, a carrier phase measurement with respect to the first positioning-related signal and the second positioning-related signal, under a constraint of having a difference between the first carrier frequency and the second carrier frequency to be conformed against a defined value; and sending, by the first wireless device to a second wireless device, the carrier phase measurement.

2. The method of claim 1, wherein the difference between the first carrier frequency and the second carrier frequency is configured to be at least one of:

equal to a defined value, greater than the defined value, or smaller than the defined value, wherein the defined value comprises a bandwidth of a positioning reference signal (PRS) of the first positioning-related signal or the second positioning-related signal.

3. The method of claim 1, wherein:

the first wireless device comprises a user equipment (UE), and the second wireless device comprises a base station (BS).

4. The method of claim 1, wherein:

the first wireless device comprises a user equipment (UE), and the second wireless device comprises a location management function (LMF).

5. The method of claim 1, wherein:

the first wireless device comprises a base station (BS), and the second wireless device comprises a user equipment (UE).

6. The method of claim 1, wherein: the first wireless device comprises a base station (BS), and the second wireless device comprises a base station (BS) or a location management function (LMF).

7. The method of claim 6, comprising: indicating, by the first wireless device, an associated relationship of positioning reference signal (PRS) resources, in a group of PRS resources that are configured; and receiving, by the first wireless device from the second wireless device, a request to use the associated relationship to transmit the PRS resources in different component carriers or positioning frequency layers, or in different parts within a same component carrier or positioning frequency layer, or in one PRS resource set or different PRS resource sets, wherein the associated relationship comprises a timing relationship or a spatial relationship.

8. The method of claim 7, wherein indicating the associated relationship comprises: indicating, by the first wireless device, an identifier of a transmit timing error group for each of the PRS resources that are configured; or identifying, by the first wireless device, one of the PRS resources that are configured, to be a reference PRS resource, and indicating whether each of others of the PRS resources that are configured, is associated with the reference PRS resource.

9. The method of claim 4, comprising: receiving, by the first wireless device, positioning reference signal (PRS) resources according to an associated relationship of the PRS resources that comprises a timing relationship or a spatial relationship; and sending, by the first wireless device to the second wireless device, the carrier phase measurement and an identifier of a receive timing error group for each of the PRS resources; or sending, by the first wireless device to the second wireless device, the carrier phase measurement which comprises: a first measurement for a reference PRS resource, and a difference value relative to the first measurement for each of others of the PRS resources.

10. The method of claim 1, comprising: sending, by the first wireless device to the second wireless device, a capability of the first wireless device to support use of the carrier phase measurement to determine a position of the first wireless device.

11. The method of claim 1, comprising: receiving, by the first wireless device from the second wireless device, a request to determine the carrier phase measurement, wherein the carrier phase measurement comprises a difference in carrier phase values corresponding to the first positioning-related signal and the second positioning-related signal.

12. The method of claim 1, wherein: the carrier phase measurement comprises a first arrival time and a second arrival time corresponding to the first positioning-related signal and the second positioning-related signal, respectively, and the timing relationship or the spatial relationship being used by the first wireless device.

13. The method of claim 1, comprising: determining, by the first wireless device, an assistance measurement according to the first positioning-related signal and the second positioning-related signal; and sending, by the first wireless device to the second wireless device, the assistance measurement.

14. The method of claim 13, wherein: the assistance measurement comprises a distance between a first antenna corresponding to the first positioning-related signal and a second antenna corresponding to the second positioning-related signal.

15. The method of claim 13, wherein: the assistance measurement comprises a geographical coordinate information of the first positioning-related signal and the second positioning-related signal.

16. The method of claim 1, wherein: the carrier phase measurement comprises beam indices corresponding to the first positioning-related signal and the second positioning-related signal.

17. The method of claim 1, wherein: at least one of the first positioning-related signal or the second positioning-related signal each comprises: a sounding reference signal (SRS), or a positioning reference signal (PRS).

18. A first wireless device comprising: at least one processor configured to:
receive, via a transceiver, a first positioning-related signal with a first carrier frequency and a second positioning-related signal with a second carrier frequency;
determine a carrier phase measurement with respect to the first positioning-related signal and the second positioning-related signal, under a constraint of having a difference between the first carrier frequency and the second carrier frequency to be conformed against a defined value; and
send, via the transceiver to a second wireless device, the carrier phase measurement.

19. A method comprising: receiving, by a second wireless device from a first wireless device, a carrier phase measurement, wherein the carrier phase measurement is determined with respect to a first positioning-related signal with a first carrier frequency, and a second positioning-related signal with a second carrier frequency, under a constraint of having a difference between the first carrier frequency and the second carrier frequency to be conformed against a defined value.

20. A second wireless device comprising: at least one processor configured to:
receive, via a transceiver from a first wireless device, a carrier phase measurement,
wherein the carrier phase measurement is determined with respect to a first positioning-related signal with a first carrier frequency, and a second positioning-related signal with a second carrier frequency, under a constraint of having a difference between the first carrier frequency and the second carrier frequency to be conformed against a defined value.

* * * * *